(12) United States Patent
Depoutot et al.

(10) Patent No.: US 10,013,648 B2
(45) Date of Patent: Jul. 3, 2018

(54) METHOD FOR FABRICATING AN ELECTRONIC/ELECTRICAL CIRCUIT DEVICE

(71) Applicant: GEMALTO SA, Meudon (FR)

(72) Inventors: Frédéric Depoutot, Gémenos (FR); François Dauphin, Gémenos (FR)

(73) Assignee: GEMALTO SA, Meudon (FR)

(*) Notice: Subject to any disclaimer, the term of this patent is extended or adjusted under 35 U.S.C. 154(b) by 0 days.

(21) Appl. No.: 15/304,782

(22) PCT Filed: Apr. 17, 2015

(86) PCT No.: PCT/EP2015/058438
§ 371 (c)(1),
(2) Date: Oct. 17, 2016

(87) PCT Pub. No.: WO2015/158915
PCT Pub. Date: Oct. 22, 2015

(65) Prior Publication Data
US 2017/0039464 A1    Feb. 9, 2017

(30) Foreign Application Priority Data
Apr. 18, 2014  (EP) .................................. 14305587

(51) Int. Cl.
*G06K 19/02* (2006.01)
*G06K 19/07* (2006.01)
(Continued)

(52) U.S. Cl.
CPC ..... *G06K 19/0702* (2013.01); *G06K 19/0776* (2013.01); *G06K 19/07707* (2013.01);
(Continued)

(58) Field of Classification Search
USPC .......................... 235/375, 380, 451, 488, 492
See application file for complete search history.

(56) References Cited

U.S. PATENT DOCUMENTS 5,612,532 A * 3/1997 Iwasaki ............ G06K 19/07745
235/486
5,773,880 A    6/1998 Ohno
(Continued)

FOREIGN PATENT DOCUMENTS

DE      103 43 734 A1   4/2005
EP       0 581 284 A2   2/1994
(Continued)

OTHER PUBLICATIONS

International Search Report (PCT/ISA/210) dated Jun. 24, 2015, by the European Patent Office as the International Searching Authority for International Application No. PCT/EP2015/058438.
(Continued)

*Primary Examiner* — Tuyen K Vo
(74) *Attorney, Agent, or Firm* — Buchanan Ingersoll & Rooney PC

(57) ABSTRACT

The invention relates to a method for fabricating an electronic device comprising an electronic/electrical circuit, wherein it comprises the following steps: formation of a support-body comprising a battery inside; making of a cavity emerging on the surface of the support-body, said cavity revealing connection terminals of the battery; connection of an electronic/electrical circuit to the battery via the terminals situated in said cavity; exchanging of data in the electronic/electrical circuit by electrical contact. The invention also relates to the corresponding electronic device.

10 Claims, 3 Drawing Sheets

(51) Int. Cl.
*G06K 19/077* (2006.01)
*H01M 2/10* (2006.01)
*H02J 7/00* (2006.01)

(52) U.S. Cl.
CPC .... *G06K 19/07722* (2013.01); *H01M 2/1022* (2013.01); *H02J 7/0045* (2013.01); *H01M 2220/30* (2013.01)

(56) References Cited

U.S. PATENT DOCUMENTS

| | | | | |
|---|---|---|---|---|
| 6,019,284 | A * | 2/2000 | Freeman | G02F 1/13452 235/375 |
| 6,100,804 | A * | 8/2000 | Brady | G06K 19/07749 257/678 |
| 6,902,116 | B2 * | 6/2005 | Finkelstein | G02B 3/08 235/379 |
| 8,899,487 | B2 * | 12/2014 | Saito | G06Q 20/341 235/382 |
| 2006/0227523 | A1 * | 10/2006 | Pennaz | H01M 6/40 361/783 |
| 2008/0223925 | A1 * | 9/2008 | Saito | G06Q 20/341 235/380 |
| 2008/0297350 | A1 * | 12/2008 | Iwasa | G06K 19/0702 340/572.1 |
| 2009/0315320 | A1 * | 12/2009 | Finn | B32B 37/1207 283/107 |
| 2010/0140359 | A1 * | 6/2010 | Hamm | G06K 19/0716 235/488 |
| 2010/0276496 | A1 * | 11/2010 | Slikkerveer | G06K 19/07 235/492 |
| 2012/0111949 | A1 * | 5/2012 | Klaas | G06K 19/07345 235/488 |
| 2012/0154290 | A1 | 6/2012 | Yang et al. | |
| 2012/0155001 | A1 * | 6/2012 | Fujikawa | H01M 2/0207 361/679.01 |
| 2013/0112756 | A1 | 5/2013 | Poidomani et al. | |
| 2013/0126622 | A1 * | 5/2013 | Finn | G06K 19/07771 235/492 |
| 2014/0016286 | A1 * | 1/2014 | Tatsu | G06K 19/07345 361/752 |
| 2014/0299666 | A1 * | 10/2014 | Kawahara | G06K 19/07707 235/488 |
| 2014/0351830 | A1 * | 11/2014 | Schnellinger | H04W 4/003 719/320 |

FOREIGN PATENT DOCUMENTS

| | | |
|---|---|---|
| EP | 2 442 259 A1 | 4/2012 |
| FR | 2 837 306 A1 | 9/2003 |
| FR | 2 838 242 A1 | 10/2003 |
| WO | WO 2006/116772 A2 | 11/2006 |

OTHER PUBLICATIONS

Written Opinion (PCT/ISA/237) dated Jun. 24, 2015, by the European Patent Office as the International Searching Authority for International Application No. PCT/EP2015/058438.

* cited by examiner

METHOD FOR FABRICATING AN ELECTRONIC/ELECTRICAL CIRCUIT DEVICE

FIELD OF THE INVENTION

The invention relates to a method for manufacturing an electronic device incorporating an electronic/electrical circuit buried in a body of the device and implementing a step of exchanging data with the buried device.

The invention mainly relates to devices with a display device or a display module such as chip cards, specifically bank cards, implementing information display which varies as a function of the time given by a supplied time base provided in the device.

Prior Art

Cards containing a built-in battery, so that the card can perform various functions requiring an internal source of energy, thus ensuring the operation of the various electronic components or modules independently of any connection, whether material or not, with an external source of energy, are already known. Such a battery may also, for example, make up for a power failure in case of immaterial connection, through an electromagnetic coupling, for example in the case of so-called "contactless" cards, wherein an antenna integrated in the card is used to transmit both the energy required for operating the card and the information exchanged between the card and a card reader.

More particularly, integrating display means in a chip card, intended for example to display a one-time password (known as OTP) or a verification value (or dCVV, the acronym for dynamic Code Verification Value) is known.

A known method for manufacturing cards comprising a display screen consists in assembling the various electronic components of the card, such as a display device, a battery, a microcontroller, etc. on the same substrate and in inserting the thus formed module into a cavity provided in a card body. Then resin is injected to fill the free spaces between the components, and between the components and the edges of the cavity, and surface sheets are positioned on either side of the body and laminated therewith to ensure the final assembly thereof, thus integrating said electronic module and the components thereof in the body and between the surface layers.

In the known methods for manufacturing multi-component chip cards, the electronic circuit can be connected to an electrical communication interface with the outside via an ISO 7816 contact module of the chip card type, or via a radio frequency antenna contactless interface. This method makes it possible to exchange data after completion of assembling to customize, program and/or test, electrically adjust the electronic circuit.

However, using an electrical communication interface via the ISO 7816 contact module is disadvantageous in that it requires a printed circuit which is more complex to complete and to integrate. And using a radio frequency communication specifically requires a contactless chip and a radio-frequency antenna which increase the final device manufacturing cost.

TECHNICAL PROBLEM

The invention aims at remedying the above drawbacks.
The invention provides a simple and inexpensive method for manufacturing an electronic/electrical circuit device buried in a body of the device and requiring a step of exchanging data after being buried.

More particularly, the invention makes it possible to simply and economically solve the problem of electrically adjusting the RTC clock after integrating and connecting a display module in/with a battery inside a device such as a chip card.

SUMMARY OF THE INVENTION

For this purpose, the invention relates to a method for manufacturing an electronic device comprising an electronic/electrical circuit. The method is characterized in that it comprises the following steps:
  forming a support body comprising a battery inside,
  making a cavity opening onto the surface of the support body, with said cavity revealing terminals for connecting the battery,
  connecting an electronic/electrical circuit to the battery via the terminals located in said cavity,
  exchanging data with the electronic/electrical circuit by electrical contact.
According to other characteristics of the method:
  the electronic/electrical circuit comprises data exchange electrical tracks/terminals extending inside and not outside the cavity;
  the electronic/electrical circuit comprises data exchange electrical tracks/terminals extending outside the cavity;
  the display is inserted into the cavity and connected to the electronic/electrical circuit after said step of exchanging data;
  at least a portion of the data exchange electrical tracks/terminals opening out of the cavity are selected after electrical personalization;
  the display device and the electronic/electrical circuit connected together are inserted into the cavity and connected to the battery;
  the electronic/electrical circuit comprises a real time clock (RTC) and the step of exchanging data includes a step of setting or adjusting the clock time;
  the electronic/electrical circuit has a main surface larger than that of the display device so as to leave said data exchange tracks/electrical terminals accessible in the cavity;
  a space (E) situated above the tracks/electrical terminals 13 is filled with filling material.
The invention also relates to a device corresponding to the method above.

DESCRIPTION

The following description mainly relates to a first embodiment for implementing a method for manufacturing an electronic device 1A comprising an electronic display 2.

Figure 1:
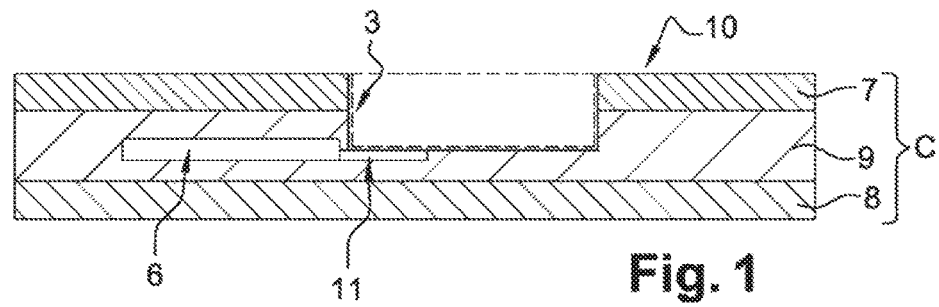
FIG. 1 illustrates a first step of providing/producing a device according to the invention having a cavity for receiving an electronic display such as an electrical/electronic circuit.

In FIG. 1, the method comprises a first step of providing/manufacturing a device 1A according to the invention with a cavity 3 for receiving an electrical and/or electronic module M (4, 5) and with a battery 6.

The device 1A in the example is a chip card and the electrical/electronic module is a display module or an electronic display M (4, 5). The device 1A, 1B can be any electronic device such as an electronic passport, a flash drive, a PDA, a mass memory card, any object with an electronic function buried in the body of the object.

The buried module M (4, 5) may be any electrical/electronic module such as a fingerprinting module, a temperature sensor, a display device, etc.

This step more particularly consists of two phases comprising forming a support body C having a battery inside, in particular by lamination of polymer and/or adhesive sheets or layers 7, 8, 9 respectively for the front face, for the rear face and for the central layer.

Alternately, such step can be performed by injection of material around a battery 6.

The method also comprises a step of forming a cavity 3 preferably opening into the rear surface 10 of the support body C, with said cavity revealing terminals 11 for connecting the battery. In the example, after the lamination, a cavity 3 is produced by machining until the interconnection pads/terminals 11 of the battery are revealed. Such terminals are used to interconnect corresponding terminals or pads of the module M.

According to another solution, the cavity may be produced while molding the body of the device 1A, 1B in a single phase, with a mold core substantially matching the dimensions of the cavity and providing or reserving the cavity 3.

Figure 2:
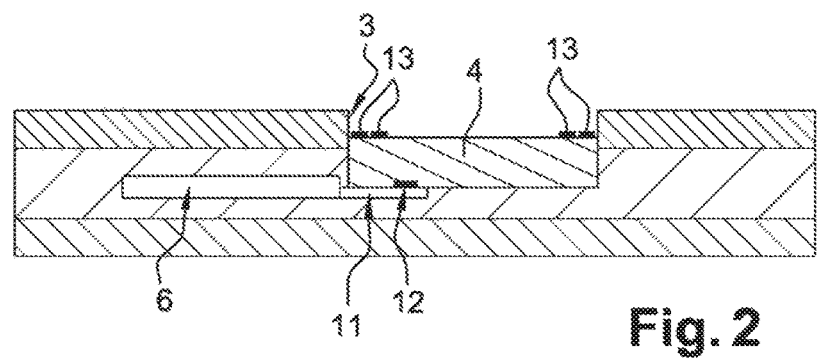
FIG. 2 illustrates a second step of transferring the display device control electronic circuit into the device of the previous figure.

According to another subsequent step illustrated in FIG. 2, this embodiment provides for a connection of an electronic circuit 4 to the battery with the terminals located in said cavity. In the example, an electronic circuit 4 is transferred and simultaneously connected in the cavity 4, whereas drops of anisotropic conductive adhesive (not shown) have been deposited beforehand onto the interconnection pads/terminals 11 of the battery or the circuit 4. Other connection methods can be considered such as the ACF (anisotropic conductive adhesive or with conductive silicone) technologies.

The module has here overall dimensions which can be substantially compared with/adjusted to the dimensions of the cavity. The electronic circuit is here a printed circuit 4 formed on a thin flexible substrate and less than about 200 µm. For example, the thickness of the flexible substrate may be equal to about 110 µm.

The circuit here includes at least one real-time clock (RTC). It may include any other function and specifically a function controlling information display on a screen/display device.

Figure 3:
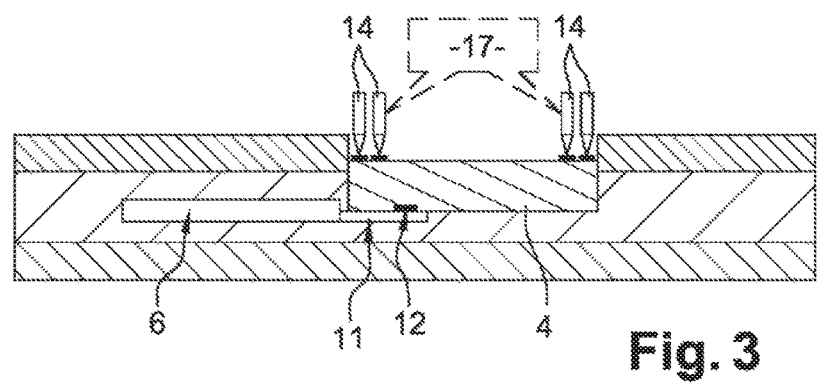
FIG. 3 illustrates a third step of exchanging data (electrical personalization/time setting, test, programming . . . ) with the electronic circuit of the preceding figure.

The method then comprises a step of exchanging data (personalization, programming of the electronic circuit, time setting . . . ) by electrical contact as shown in FIG. 3.

For this purpose, the electronic circuit comprises here accessible electrical interconnection pads/tracks or terminals 13 which extend inside the cavity 3 to perform the exchange of data.

In the example, as the data exchange, the method provides at least a time setting or adjusting when the clock is connected to the battery. Data is preferably exchanged here by electrical contact of pins 14 for transferring data to the data exchange terminals 13 provided for this purpose.

The device 1A can be moved to a data exchange position after a partial insertion position of a part of the electronic/electrical module.

Figure 4:
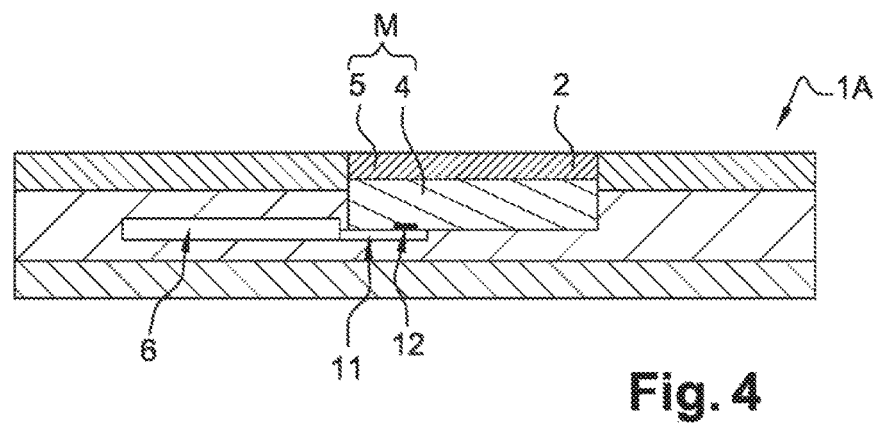
FIG. 4 illustrates a fourth step of transferring and connecting a display device to the electronic circuit illustrated in the previous figure.
Figure 5:
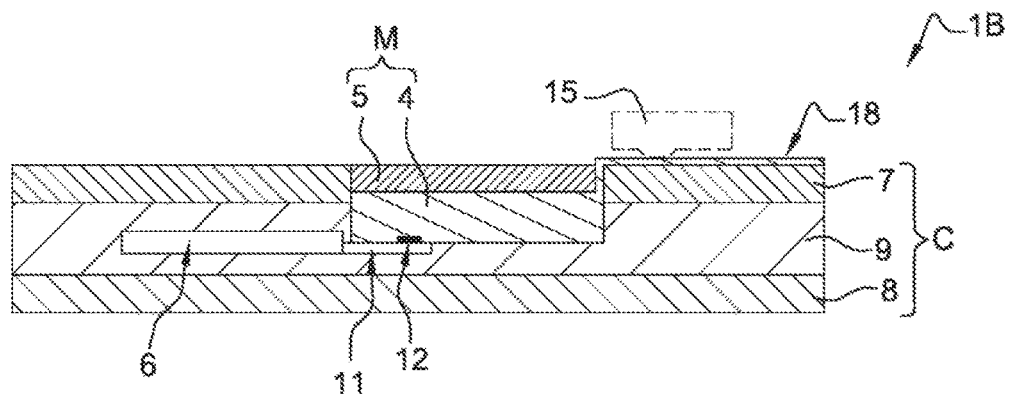
FIG. 5 illustrates a second step of an alternate embodiment showing the transfer and the connection of a complete display device (with a control circuit including a RTC circuit) to/with the battery of the device illustrated in FIG. 1.

According to one characteristic of the method according to the first embodiment, illustrated in FIG. 4, a complementary portion 5 of the electronic/electrical module M is inserted into the cavity. In the example, the display device 5 itself (without the clock, the control chip) is inserted into the cavity and connected to the electronic circuit 4 after said step of exchanging data by electrical contact.

The connection can be provided as before using anisotropic conductive adhesive. However, the screen can be generally connected to the flexible circuit by another type of conductive, not necessarily anisotropic, adhesive.

The method of the invention can also be implemented according to an alternative embodiment illustrated in FIGS. 1, 5, 6, 7.

Such alternative solution can share the steps of the first embodiment illustrated and described while referring to FIG. 1.

This alternate solution may differ in that the electronic/electrical circuit comprises data exchange (transfer, programming . . . ) tracks 18 extending outside the cavity 3 of the device 1B.

In the example, the electronic module M is complete and comprises interconnection tracks/contact pads 18 which extend out of the cavity. In the example, the complete electronic module comprises interconnection tracks/contact pads 18 which extend from the printed circuit 4 along the wall of the cavity 3 to emerge at the surface 10 of the device body. Such electrically conductive tracks/terminals can be folded preferably substantially at right angle to conform to the surface 10 of the device body. The invention preferably provides for a press or a tool for folding 15 or conforming the tracks/terminals so that they remain folded against the outer surface 10 of the device.

The tracks here are carried by a thin substrate but might come freely without any substrate at least at the data exchange tracks 18. The terminals or tracks are oriented outwards when they are folded flat against the surface 10 of the device body using the press or the folding tool 15.

As shown in the example, the electronic/electrical module M is complete for the insertion as compared to the previous embodiment (i.e. in the example, the parts 4 and 5 are already pre-assembled and pre-connected together). This module M could have been inserted in two parts as in the first embodiment. Here the electronic circuit comprises 4 at least the RTC clock and is fixed to the display device 5. The module M may also comprise a printed circuit chip (not shown) for controlling the screen/display device and the screen itself.

Figure 6:
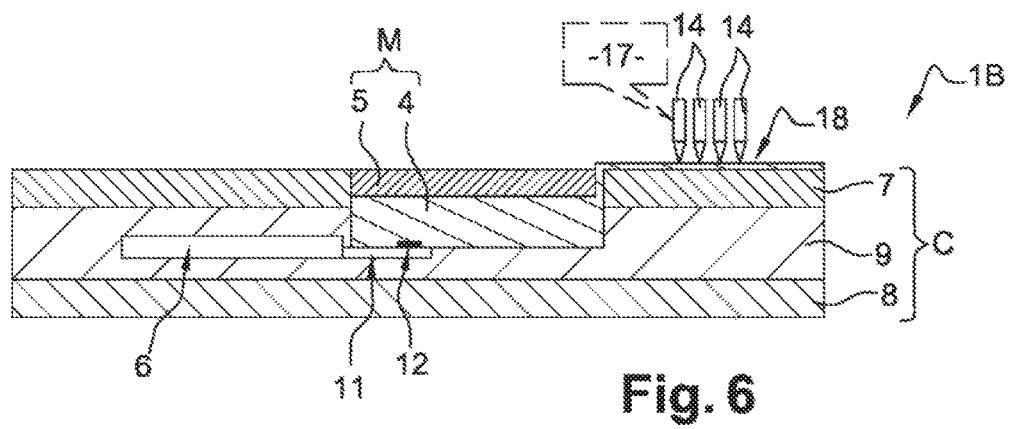
FIG. 6 illustrates a third step of an alternate embodiment showing data exchange (electrical personalization/time setting/programming)
Figure 7:
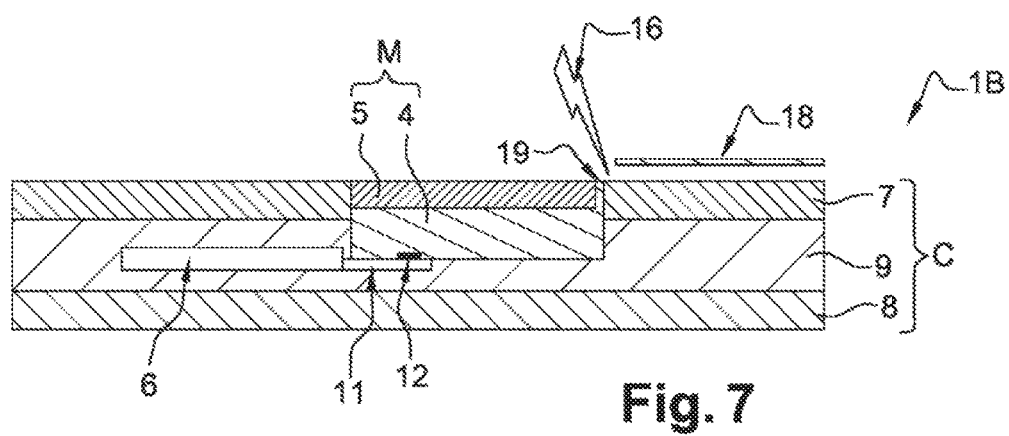
FIG. 7 illustrates a fourth step of the alternate embodiment showing the elimination of the contact pads for the exchange of data (electrical personalization/time setting/programming).

In FIG. 6, the method provides the step of exchanging data as above, using data exchange electric pins 14 in an exchange data position 17, coming into contact with the terminals 18 whereas the latter are arranged at the surface of the device.

According to an alternative embodiment, the method may provide to remove at least a portion of the data exchange electrical tracks 18 opening out of the cavity 3 after completion of the data exchange.

In the example, the portions of tracks are cut using a laser beam 16 along the edge of the interface 18 between the cavity and the module.

According to an advantageous embodiment, the tracks 18 are held stationary outside and may form at least a portion of a terminal block of specifically ISO 7816 standard contact pads. The tracks may be glued on the body surface after being folded, using the tool 15. Such provisions more particularly avoid having to connect a contact module to a multi-component printed circuit and to provide for two cavities (one for the ISO 7816 module and one for a display device).

In an alternative embodiment, the tracks and/or the substrate 18 of the tracks comprise a precut or weak zone located closest to the cavity 3, for instance close to the interface 18, or preferably deeper in the cavity. After data exchange, programming, testing, adjustment or any other operation, the tracks/terminals are thus cut by simply pulling the tracks and the tracks/terminals cutting edges are located in the cavity in an invisible way.

The invention may provide to fill the gap which may exist at the interface 18 (between the module and the cavity wall) which remains when removing the interconnection tracks 18 so as to hide or isolate from the outside the tracks 18 thus sectioned at the interface 19 (or deeper in the cavity). The filling may be executed by spraying isolating material, using CAV (computer assisted video) or for example by depositing material which may sink in by capillarity.

If need be, the invention may provide on at least the face of the body having the module, to add one or more covering layer(s). Such layers may be transparent or translucent at least at the display screen.

The device can thus produce, at a lower cost, an object comprising an electrical/electronic circuit, to be personalized after being buried in the device body.

For example, it is not necessary for the device to have a contactless, i.e. a specifically radio frequency (RF chip and antenna) communication interface which would enable an electric personalization after inserting the circuit and connecting same to the battery.

In the case of a bank chip card, comprising an integrated circuit chip module and standard (ISO 7816) electrical contact pads, a display device reduced in size without any other interaction of or modification to the chip card than adding a battery, can be added, in the zone provided for a CVV number. The display device may have a surface approximately 3×3 mm in dimensions, visible at the main outer surface of the bank card.

The screen 5 may be of the preferably bistable electronic paper type. The screen may be a "Kindle" by the "Amazon Company." It comprises small two tone balls which are oriented to the white side or to the black side, depending on the electric field.

In the examples, the electronic circuit comprises a chip comprising a specifically crystal-controlled real time clock (RTC).

The invention thus makes it possible to have, at a lower cost, an object with a time-dependent dynamic CVV function or an OTP (One time password) function, to generate a one-time number or password. The screen may have a larger size and/or be positioned on the main front face of the object.

A third embodiment of the method for manufacturing an electronic device will now be described while referring to FIGS. 8, 9 and 10.

Figure 8:
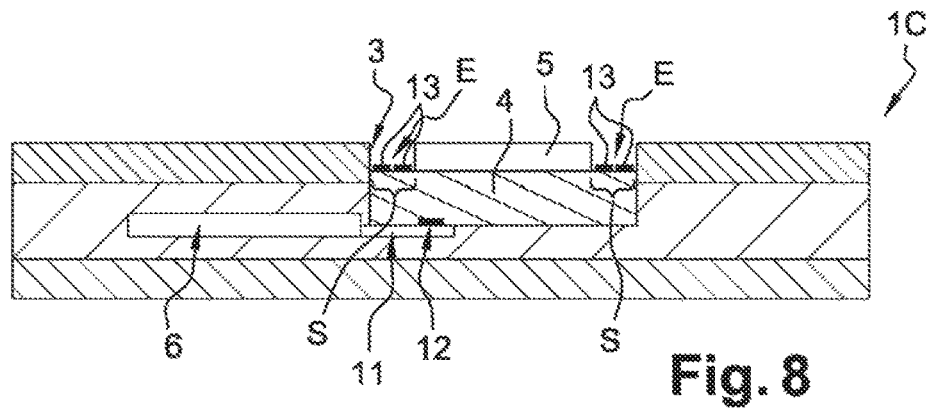
FIGS. 8, 9 and 10 illustrate steps of a third embodiment for implementing the method for manufacturing an electronic device according to the invention.

FIG. 8 shows a step of assembling the module M in the cavity. The electronic/electrical circuit 4 has a larger main surface than that of the display device, so as to leave a surface of the circuit comprising the data exchange tracks/electrical terminals (13), accessible in the cavity. Alternately, a surface of the circuit 4 may comprise the data exchange tracks/electrical terminals 13, accessible in the cavity and projecting laterally from the edge of the display device.

In the example, the display device is substantially centered on the surface of the circuit 4 so as to leave the tracks/terminals 13 at the edge of the display device.

As mentioned above, the display may preferably be assembled prior to the insertion and connection of the set M in/to the battery. This makes it possible to use a traditional insertion method based on pressure and temperature since there is no contact with the screen or pressure exerted thereon. The insertion is carried out by maintaining pressure onto the area of the circuit which is not covered by the screen 5 (or the display device).

Incidentally, in all the embodiments where the circuit 5 and the connection terminals 12 of the battery are accessible in the cavity, the circuit and the battery may be connected using thermo-compression or ultrasound also through the substrate of the circuit (the terminals for connecting or interconnecting the circuit to the battery may be located directly above the groove around the display device).

Figure 9:
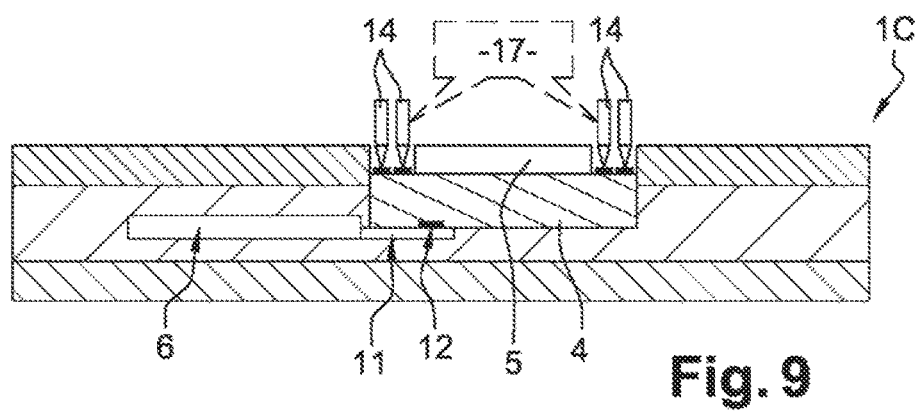

FIG. 9 illustrates the step of exchanging data with the electronic/electrical circuit 4 by electrical contact.

The electric transfer pins can freely access the data exchange electrical tracks/terminals 13 placed in the cavity, since they are not covered by the display device 5. Programming (or initialization and pre-personalization) can be carried out.

Figure 10:
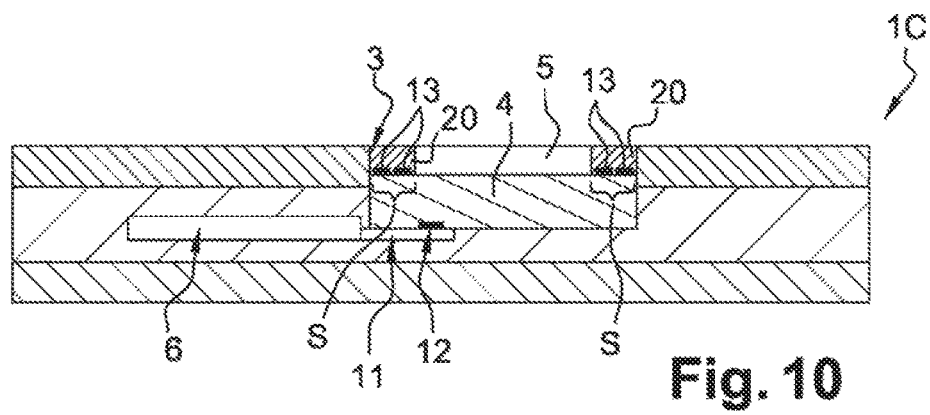

FIG. 10 shows a step of filling the space above the tracks/terminals 13.

According to one characteristic of this third embodiment, the space is filled with filler. The tracks/terminals 13 may be hidden using a printing method of the ink-jet, material-jet types or by setting a pre-printed label.

The hidden area or space E preferably has a frame-shaped geometry around the display device. This frame has external dimensions (L×W) substantially smaller than those (L'×W') of the cavity 3. The frame has sufficient smaller dimensions to cover the entire area or space E located around the display device 5 and in the cavity 3.

The masking or the filler do not necessarily overlap on the edge of the screen or on the edge of the cavity, but the masking or the filler may be flush with such edges or leave a very small gap.

The pre-printed label may be produced using conventional label manufacturing methods: transportation in rolls for the steps of printing and cutting and transfer into the cavity 3.

Cold-sealing adhesive (PSA: pressure sensitive adhesive) or heat curable adhesive can be used for fixing.

In all the embodiments described above, the electronic/electrical circuit 4 is different from an electrical contact and/or chip card antenna module. The data exchange tracks/electrical terminals 13 are different from the electrical contact pads of a chip card module, specifically to the ISO 7816 format and flush with the surface. Similarly, the tracks 13 are also different from a radio frequency communication antenna.

The invention claimed is:

1. A method for manufacturing an electronic device comprising an electronic/electrical circuit, comprising the following steps:
    forming a support body comprising a battery inside,
    making a cavity opening onto a surface of the support body, with said cavity revealing connection terminals of the battery,
    connecting the electronic/electrical circuit to the battery via the terminals located in said cavity,
    exchanging data between the electronic/electrical circuit and an other electronic device by electrical contact of the other electronic device with tracks/electrical terminals of the electronic/electrical circuit, said tracks/electrical terminals being different terminals from ISO 7816 contacts of a smart card module, and
    after said exchanging data, disposing insulating material to physically block electrical contact with said tracks/electrical terminals or severing said tracks/electrical terminals.

2. A method according to claim 1, wherein the electronic/electrical circuit comprises data exchange tracks/electrical terminals extending inside the cavity.

3. A method according to claim 1, wherein the electronic/electrical circuit comprises data exchange tracks/electrical terminals extending outside the cavity.

4. A method according to claim 1, wherein a display device is inserted into the cavity and connected to the electronic/electrical circuit after said step of exchanging data.

5. A method according to claim 3, wherein at least a portion of the data exchange tracks/electrical terminals opening out of the cavity are removed after said step of exchanging data.

6. A method according to claim 1, wherein a display device and the electronic/electrical circuit connected together are inserted into the cavity and connected to the battery.

7. A method according to claim 1, wherein the electronic/electrical circuit comprises a real time clock and the step of exchanging data includes a step of setting or adjusting the clock time.

8. A method according to claim 6, wherein the electronic/electrical circuit has a main surface larger than that of the display device so as to leave said data exchange electrical tracks/terminals accessible in the cavity.

9. A method according to claim 1, wherein a space situated above the tracks/electrical terminals is filled with filling material.

10. An electronic device, comprising:
    a support body having a battery inside,
    a cavity opening onto a surface of the support body and containing terminals for connecting the battery,
    an electronic/electrical circuit connected to the battery via the terminals located in said cavity, and
    tracks/electrical terminals of the electronic/electrical circuit configured for electrical contact with an other electronic device being buried under the surface of the support body, said tracks/electrical terminals being different terminals from ISO 7816 contacts of a smart card module and physically blocked from electrical contact using insulating material or severed.

* * * * *